June 2, 1925.

W. STEWART 1,540,039

DIRECT EXPANSION ICE MAKING MACHINE

Filed Nov. 17, 1921

Inventor:
William Stewart

June 2, 1925.　　　　　　W. STEWART　　　　　　1,540,039
DIRECT EXPANSION ICE MAKING MACHINE
Filed Nov. 17, 1921　　　　2 Sheets-Sheet 2
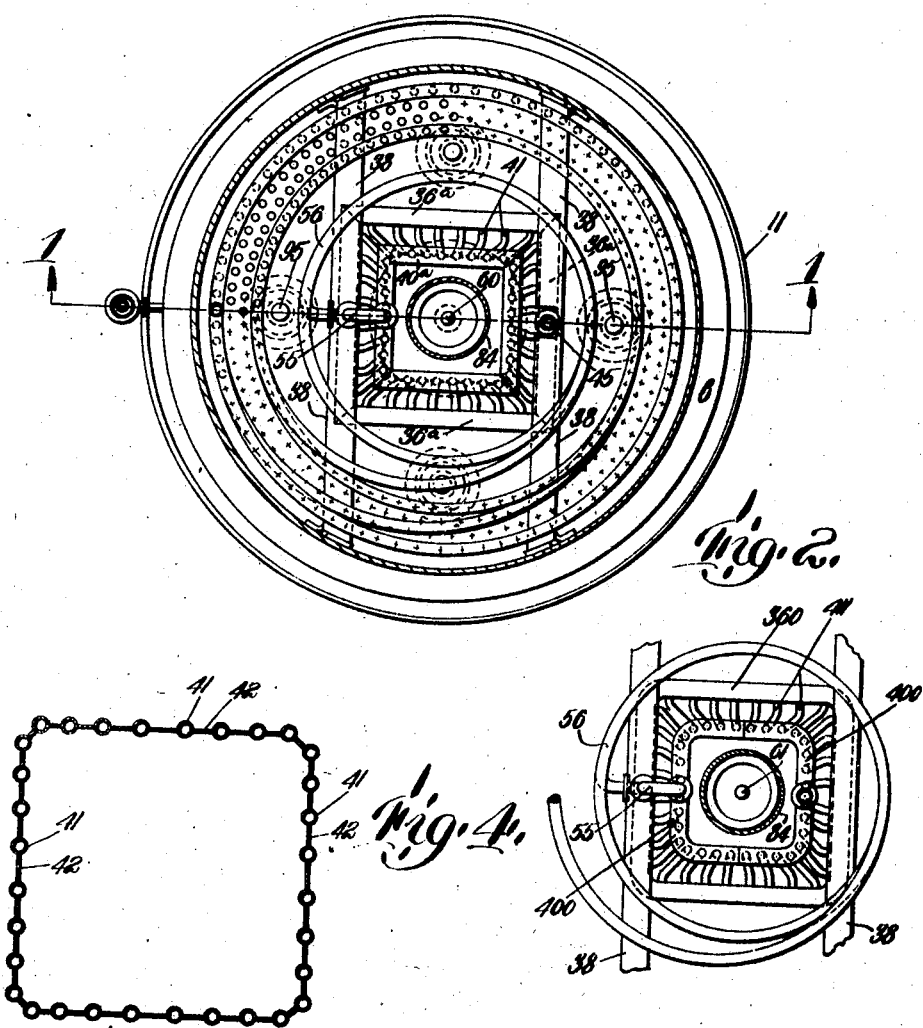

Patented June 2, 1925.

1,540,039

UNITED STATES PATENT OFFICE.

WILLIAM STEWART, OF PORTLAND, MAINE.

DIRECT-EXPANSION ICE-MAKING MACHINE.

Application filed November 17, 1921. Serial No. 515,790.

*To all whom it may concern:*

Be it known that I, WILLIAM STEWART, a subject of the King of Great Britain, having declared my intention of becoming a citizen of the United States, residing at Portland, in the county of Cumberland and State of Maine, have invented new and useful Improvements in Direct-Expansion Ice-Making Machines, of which the following is a specification.

In the commercial manufacture of ice in block form it has been usual to employ a refrigerant such as brine which is caused to circulate about cells or tanks containing the water to be frozen, the brine being cooled by expansion of ammonia, carbon dioxide, or other suitable easily liquefiable gas. This indirect method necessitates a brine circulation system including pumps and cooler which are troublesome and expensive to maintain.

The freezing of the water in the cells takes place progressively from the walls inwardly, the rate of freezing decreasing rapidly as the ice increases in thickness due to its heat-insulating qualities which increase approximately as the square of the thickness. It requires commonly between three and four days of continuous operation to freeze closed a cell twelve to fourteen inches across. This slow action means a total freezing capacity of from three to four times the daily output of the plant. It requires continuous operation day and night and usually an ice storage for the tanks emptied during the night or during the periods of small demand. The large plant capacity also carries with it large superficial area of apparatus exposed to radiation losses to the surrounding atmosphere, such losses amounting in many cases to one half the entire energy of the plant. The great weight of the apparatus also requires heavy machinery such as cranes and the like for handling and manipulating the parts.

The present invention provides a construction in which direct action of the expansive agent on the water is obtained, thus eliminating the necessity of brine circulation with all its attendant complications and care.

Further it not only refrigerates through the walls of ice as they are formed but also directly at the surface where freezing is taking place. This is effected by continuously applying the water to the congealing surface and vaporizing a portion thereof by subjecting it to vacuum conditions. This materially reduces the time required to close the tank with ice, correspondingly increasing the capacity of the machine, reducing the size necessary for a given output, and therefore reducing the superficial area exposed to radiation. Radiation losses are also reduced by the elimination of the brine circulating system and are still further reduced because of the decreased time required to effect freezing. All these factors react on each other to augment the increase of the speed of the plant so that a few hours instead of days is sufficient to complete the freezing. This makes night operation of the plant unnecessary except when continuous or increased production is desirable, and makes it possible to more closely gage the production to the hourly demand so that little or no storage space is required. Decreased size of plant, moreover, requires less machinery to handle the parts, smaller cost for buildings and ground and upkeep expenses, and decreased labor costs.

For the purpose of utilizing the expansive agent directly a novel form of cell or tank is utilized having hollow walls through which the agent is passed and which is capable of withstanding high pressures for purposes to be described. This cell is open from below so that water may be sprayed upwardly against the inner walls thereof or on the inner surface of the ice as it is being formed thereon, the container being enclosed in a casing within which a vacuum is maintained in order to vaporize a portion of the water sprayed. The casing is exhausted, as by means of an aspirator, and to increase the extent of the exhaustion, means are provided for condensing vapor outside the cell.

Other detail features designed to aid in the freezing operation also form parts of this invention, for a more complete understanding of which reference may be had to the accompanying drawings illustrating an embodiment thereof in which—

Figure 2 is a horizontal section on line 2—2 of Figure 1.

Figure 3 is a horizontal section through the ice cell on line 3—3 of Figure 1.

Figure 4 is a fragmentary view similar to a portion of Figure 2, but illustrating a modified construction of ice cell.

Figure 1:
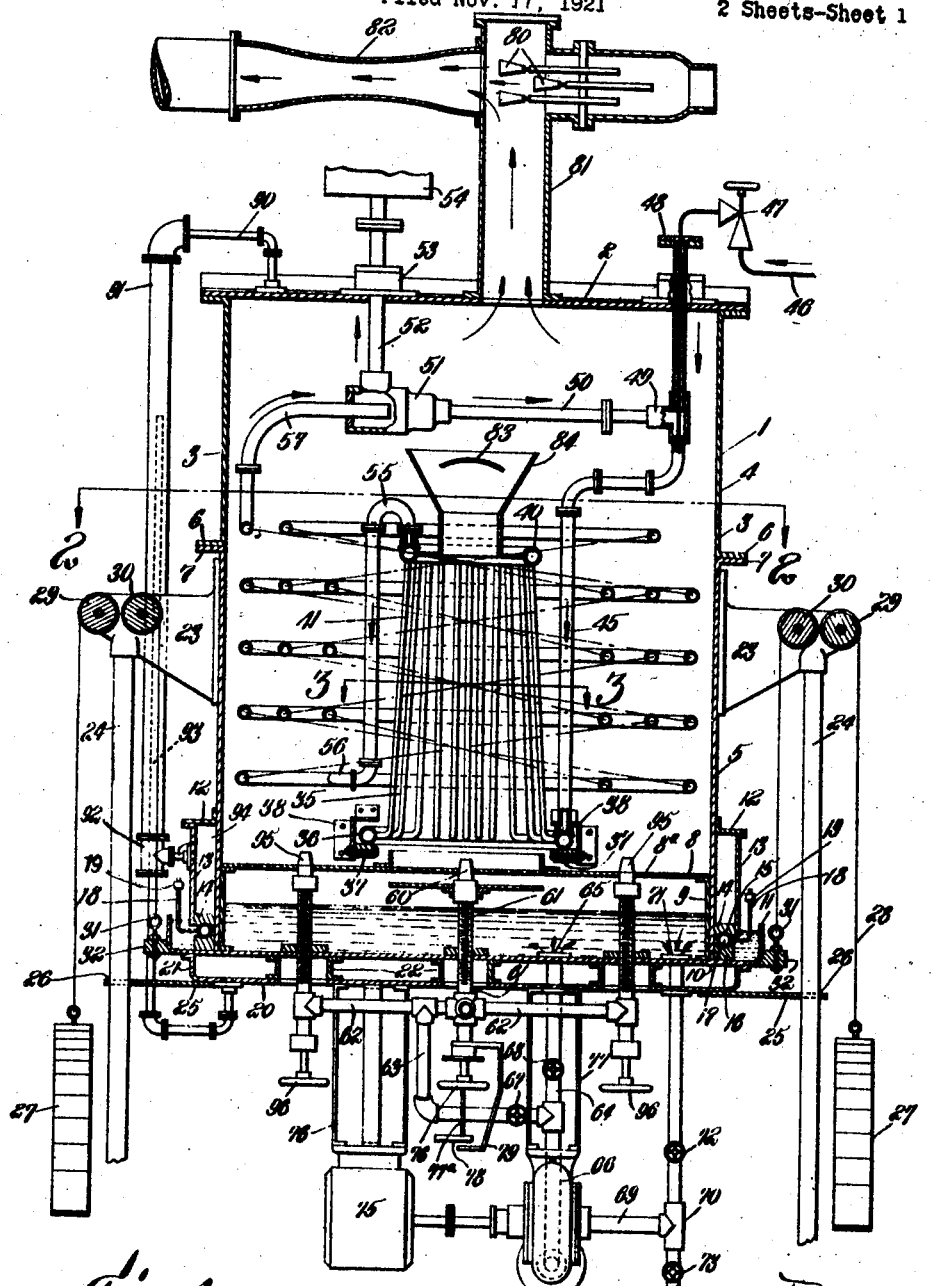
Figure 1 is a vertical section through the machine on line 1—1 of Figure 2.

Referring more particularly to Figure 1, at 1 is indicated a casing comprising a top wall 2 and side walls 3. These side walls may, if desired, be formed as a pair of ring sections 4 and 5 having mating flanges 6 and 7 by which they may be fastened together. The lower end of this casing may be sealed off by means of a water reservoir or chamber indicated at 8. This chamber as shown comprises a vertical outside wall 9 passing upwardly within the section 5, this side wall being mounted on a base member 10 which extends outwardly beyond the section 5 and the outer end of which is formed as an upwardly directed flange or rim 11.

For the purpose of forming a sealing engagement between the reservoir and casing, the lower portion of the casing has fixed thereto a pair of annular members 12 and 13 which form a box like structure around the portion 5, this structure being closed at its base by means of a ring member 14 having an annular recess 15 in its lower face. Positioned opposite the ring 14 a similar ring 16 is carried by the base plate 10 and between these rings 14 and 16 may be seated an inflatable circular tube 17. At 18 are shown a pair of air pipes having air valves 19 thereon by means of which the tube may be inflated. In order to further insure a sealing joint between the casing and the reservoir, water may be placed within the flange 11 to a level somewhat above the tube 13 to form a water seal.

In order to prevent radiation losses as much as possible through the base plate 10, a second plate 20, having an upwardly turned margin 21 may be made fast to the lower face of the plate 10, suitable spacing and stiffening elements 22 being positioned between these plates in order to form therewith a chamber which may be exhausted of air as will later be described.

The casing is carried in fixed position. For this purpose brackets 23 are made fast to the outer face of the ring member 5, these brackets being supported on posts 24 extending upwardly from any suitable foundation (not shown).

The reservoir 8 may be lowered from the bottom of the casing for purposes to be later described, being guided for vertical motion from posts 24 by means of plates 25 extending outwardly from the base of the plate 20 and having perforations 26 through which these posts 24 pass. The water reservoir, together with certain apparatus carried thereby, as will be explained, may be held upwardly into sealing engagement in the casing by means of weights 27 made fast at the lower end of cables 28, each cable passing about a pair of guide pulleys 29 and 30 journaled near the outer end of each bracket 23 and from thence downwardly to eye bolts 31 made fast by any suitable means as in blocks 32 welded thereto to the reservoir 8.

Positioned within the casing 1 is an ice cell or tank shown at 35. This cell preferably comprises a lower pipe section 36 which may be carried on blocks 37 made fast at the lower end of angle iron supports 38 extending across the casing as shown more particularly in Figure 2. As shown also in this figure this pipe 36 may be formed square being made of sections 36$^a$ beveled at their ends and welded together. The upper end of the cell is formed of a similar pipe section 40 which may be formed of straight pipe elements 40$^a$ welded at their beveled ends similar to the lower pipe section. The upper section, however, is smaller than the lower section so as to give the cell a tapered formation, the larger end being positioned downwardly. The side walls of the cell are formed by a series of pipes 41 of smaller diameter than the pipes 36 and 40 and welded at their ends thereto. Due to the tapered formation which it is desired to give the cell, these pipes are more widely separated at their lower ends than at their upper ends and they are preferably bent outward sharply adjacent their lower ends to enter the lower pipe sections substantially in the plane thereof. This causes the lower open end of the tank to be unobstructed so that the ice may pass outwardly thereof after it is formed in a manner which will be described. As the pipes 41 are spaced somewhat, filler members 42 are positioned therebetween and are welded along the lengths of the pipes so that when the cell is completed the pipes 41 are made fast to each other along their lengths to form a hollow walled cell capable of withstanding considerable pressure.

As shown in Figure 1 lower pipe 36 has connected thereto an inlet pipe 45 which extends upwardly and out through the top 2 of the casing. Outside the casing is a smaller pipe 46 having an expansion or reducing valve 47 therein, this pipe extending downwardly through the cap plate 48 closing off the upper end of the pipe 45, downwardly into this pipe and somewhat beyond a T fitting 49 therein from which extends a pipe 50 to one end of which is fixed a chamber member 51. This chamber member has an outlet pipe 52 which extends upwardly through a cell 53 on the top plate 2 and to an expansion tank 54.

From the upper pipe 40 extends an outlet pipe 55 which projects downwardly outside of the cell and connects to a coil 56 which progressively rises somewhat above the top of the cell and connects to a pipe 57 extending within the chamber 51 and in direct alinement with the pipe 50. By this means a refrigerant such as a readily liquefiable gas as ammonia or carbon dioxide may be passed in its liquid form from the usual condenser (not shown) through the pipe 46 and the expansion valve and downwardly within the pipe 45. From there it passes through the pipe 36 upwardly through the pipes 41 forming the walls of the ice cell and outwardly on the other side of the top pipe 40 and then downwardly to the coils 56 and through the pipe 57 to the chamber 51. As it passes through the chamber 51, a portion of the liquid which gasifies during its passage is free to escape from the remaining liquid and find its way out through the pipe 52 to the expansion chamber 54 which leads to the suction side of the gas compressor pump. The liquefied gas "boils" in the pipes within the casing, the formation of the gas bubbles which are removed from the pipe 52 agitating and forcing the liquid so that it circulates with great rapidity. The still liquid portions pass with high velocity through the chamber 51 into the pipe 50 and down through the pipe 45 to the cell pipes and coil 56 for a second circulation. This rapid circulation serves to effect a rapid heat interchange through the cell walls and the coils so that the freezing action is unusually rapid.

The water is supplied continuously to the inner surface of the cell, this being accomplished by means of a spray nozzle 60 projecting upwardly through a perforated plate 8ª partially closing off the top of the water reservoir 8. This nozzle 60 is fixed at the upper end of a pipe 61 which projects downwardly through the reservoir 8 and communicates with a pair of horizontal pipes 62 which intersect each other at right angles substantially axially of the casing. From one of these pipes extends a supply pipe 63 communicating with a pipe 64 which extends upwardly and opens into the liquid in the reservoir 8 at 65. The other end of this pipe extends to the outlet of a pump 66. Valves are interposed in these pipe lines at 67 and 68 so that the pump may deliver either to the pipe 63 or the pipe 64.

The inlet side of the pump connects through a pipe 69 to a vertically extending pipe 70. At its upper end this pipe communicates at 71 with the water in the reservoir 8 and at its lower end is led to any suitable source of supply. Valves 72 and 73 are positioned in this pipe at either side of the connection to the pipe 69 so that water may be taken from the reservoir, valve 72 being open, into the pump, and by opening valve 67 and closing valve 68, through the pipe 63 to the pipe 61 and through the nozzle 60 where it is sprayed upwardly within the cell. By closing the valves 67 and 72 and opening the valves 73 and 68 water may be pumped from the source of supply to the reservoir. For operating the pump 66 a motor is shown at 75, the motor and pump both being supported from the lower face of the reservoir by means of hangers 76 and 77.

The nozzle 60 may be regulated by means of a hand wheel 76ª positioned axially of the pipe 61 beneath its lower end, this nozzle being preferably of the needle valve type. A rod 77ª is also shown passing upwardly into the pipe 61 having an actuating handle 78 at its lower end and a bracket 79 extending beneath the handle to prevent its removal from the pipe. This rod 77ª may extend upwardly within the nozzle valve and is intended to be used to test the formation of ice in the cell, being pushed upwardly so that its upper end may contact with the ice when it is sufficiently formed within the cell. This mechanism furnishes means to determine the completion of the freezing operation.

The casing 1 is preferably subjected to a reduced pressure, one means of doing this being shown, which comprises a series of steam jets 80 positioned within an outlet pipe 81 extending through the top wall 2 of the casing and projecting steam and vapors from the casing into a Venturi tube 82. The outer end of this tube may be connected to any suitable exhaust pump (not shown). The steam for the jets 80 is preferably exhaust steam such as may be obtained from the various steam power apparatus such as the gas pumps and so forth which are necessarily in use about the plant. This reduced pressure causes a certain amount of the water sprayed upwardly within the cell to vaporize, thus materially reducing the temperature thereof and causing the freezing to take place at the point of application of the water to the interior walls of the cell or to the surface of the ice already formed.

In order to prevent the water itself from passing outwardly of the cell in case the pressure in the nozzle is sufficient therefor, a baffle 83 is preferably positioned above the pipe 40, as shown, this baffle partly closing off a substantially funnel shaped casing 84 supported at the upper end of the cell. The vapors which pass outwardly from above and below the cell are partially removed by means of the jets and Venturi tube above described, but in order to more completely remove these vapors the cooling coils 56 have been provided. If the casing is maintained sufficiently air tight it may be necessary to use the steam jets and Venturi tube only when starting the machine or possibly at intervals while running, the coils 56 being sufficient to cause a vacuum by condensing the vapor, effecting thereby increased vaporization and removing the vapor by condensation as fast as it is formed. These coils therefore perform the dual function of causing vaporization by effecting low pressure conditions at the spray and absorbing the vapors as formed. As water in the supply reservoir is used continuously, the air may be removed therefrom by the steam jets and Venturi tube in a brief period, the coils alone then being capable of handling the water vapor, leakage only of air into the casing necessitating the employment of the other exhausting mechanism. These coils, through which, as above described, the refrigerant passes, condense the vapors and further hasten the freezing action due to the increased vaporization produced thereby from the spray. Since the interior of the casing is under reduced pressure it is easy to decrease radiation losses from the lower face of the water reservoir and adjacent the water seal with the casing by means of a vacuum jacket. For this purpose a pipe 90 communicates with the casing at its upper end and leads to a pipe 91 of comparatively large size extending vertically and having at its lower end a packing gland 92 through which is slidable a pipe 93 communicating with the interior of the pipe 91. Also communicating with this interior is a branch pipe 94 leading through the wall 13 into the annular chamber formed by the members 12, 13, and 14 around the lower edge of the casing. The pipe 93 extends downwardly and communicates with the space between the walls 10 and 20. The sliding connection between the pipes 91 and 93 permits the lowering of the water reservoir while maintaining the pipe connection to the interior of the casing.

As the ice builds up within the cell it is evident that the coils 56 become coated with ice and it is sometimes necessary to remove this ice to improve the action of these coils. In order that the low temperature of this ice may not be lost, means is provided for melting off this ice by water from the reservoir so that the water itself is cooled by this action. For this purpose a plurality of sparging nozzles 95 are positioned at intervals about the exterior of the cell to direct jets against the coil 56. These nozzles pass through the perforated plate 8ᵃ and derive their water supply from the pipes 62 at the ends of which they are positioned. Valves having control wheels 96 are provided to control the flow through these nozzles. By opening the valves 96 and closing the valve 76, water may be pumped from the tank through these sparging nozzles while the spray within the cell is discontinued. The water and ice from the exterior of the coils 56 then find their way downwardly through the plate 8ᵃ to the interior of the reservoir 8.

When the ice has been built up in the cell to the required extent, the spray is shut off and the cell and also the coil 56 may be heated by simply raising the pressure of the refrigerant therein by suitable control of the valve 47. This raising of the pressure not only heats the cell walls but also expands them so that the block is soon free to drop from within the cell onto the upper surface of the plate 8ᵃ. By drawing down the water reservoir, together with the apparatus carried thereby, breaking its sealing connection with the casing, the cake of ice is removed from within the casing in position to be removed from the machine. The particular construction of cell here shown permits direct utilization of such gases as carbon dioxide which are under high pressure when liquefied and permits practically the full pressure of the liquid to be exerted thereon when it is desired to heat and expand the cell wall to permit the detachment of the ice.

In Figure 4 a modified construction of cell has been shown in which the lower end of the cell is composed of a pair of U-shaped pipes 360 which may be welded together at their ends to form a continuous hollow ring. The upper section is composed of a pair of U-shaped pipe section 400 closed off at their ends which are then welded together to form a pair of chambers. A series of vertical pipes 411 connect the upper and lower pipe sections. The inlet and outlet pipes are then connected to opposite upper sections 400, the refrigerant passing downwardly through the vertical pipes 411 connected to one of the upper sections and upwardly through the other pipes connected to the other section. The outlet for the upper sections is connected to the condensing coils 56 in the manner already described.

While this apparatus has been described in connection with the manufacture of ice, it is evident that it might also be used for congealing other liquids as desired and might also be used to carry out fractional distillation of material such as oil to separate out paraffin and recover volatile products separated by the reduced pressure. It is also evident that if desired brine might be used as the refrigerant, it being then preferable merely to cause a single circulation through the cell walls and coils by omitting the pipe 50 and permitting the pipe 57 to connect directly to the circulation pump intake.

Having thus described certain embodiments of this invention it should be evident that many changes and modifications might be made therein without departing from its spirit or scope as defined by the appended claims.

I claim:

1. In a device of the class described, a casing, a hollow walled cell in said casing, means for circulating a refrigerant through the walls of said cell, and means for maintaining a vacuum in said casing.

2. In a device of the class described, a casing, a hollow walled cell open at its lower end positioned within said casing, means for spraying a liquid to be congealed upwardly into the open end of said cell, means for circulating a refrigerant through the walls of said cell, and means within said casing and external to said cell and through which said refrigerant passes for condensing vapors arising from said sprayed liquid to reduce the pressure within said casing.

3. In a device of the class described, a casing, a hollow walled cell open at its lower end positioned within said casing, means for spraying a liquid to be congealed upwardly into the open end of said cell, means for circulating a refrigerant through the walls of said cell, means within said casing and external to said cell and through which said refrigerant passes for condensing vapors arising from said sprayed liquid to reduce the pressure within said casing, and means actuable to remove the condensed vapors from said condensing means.

4. In a device of the class described, a casing having an open lower end, a relatively movable liquid reservoir arranged to be brought into sealing engagement with said lower end, a hollow walled cell open at its lower end positioned within said casing above said reservoir, means for spraying liquid from said reservoir up into said cell through its open lower end so that excess liquid may drain therefrom to said reservoir, and means for circulating a refrigerant through the walls of said cell.

5. In a device of the class described, a casing, a liquid reservoir at the lower end of said casing, a hollow walled cell open at its lower end positioned within said casing above said reservoir, means for spraying liquid from said reservoir up into said cell through its open lower end so that excess liquid may drain therefrom to said reservoir, and means for circulating a refrigerant through the walls of said cell.

6. In a device of the class described, a casing, a liquid reservoir at the lower end of said casing, a hollow walled cell open at its lower end positioned within said casing above said reservoir, means for spraying liquid from said reservoir through the open end into said cell so that excess liquid may drain therefrom to said reservoir, means for circulating a refrigerant through the walls of said cell, and means for reducing the pressure within said casing.

7. In a device of the class described, a casing, a liquid reservoir at the lower end of said casing, a hollow walled cell open at its lower end positioned within said casing above said reservoir, means for spraying liquid from said reservoir through the open end into said cell so that excess liquid may drain therefrom to said reservoir, and means within said casing for condensing vapor from said spray.

8. In a device of the class described, a casing, a liquid reservoir at the lower end of said casing, a hollow walled cell open at its lower end positioned within said casing above said reservoir, means for spraying liquid from said reservoir through the open end into said cell so that excess liquid may drain therefrom to said reservoir, means within said casing for condensing vapor from said spray, and means for exhausting said casing.

9. In a device of the class described, a casing, a liquid reservoir at the lower end of said casing, a hollow walled cell open at its lower end positioned within said casing above said reservoir, means for spraying liquid from said reservoir through the open end into said cell, so that excess liquid may drain therefrom to said reservoir, a length of pipe within said casing externally of said cell and communicating at one end with the hollow walls thereof, and means for circulating a refrigerant through said walls and pipe whereby liquid from said spray is congealed within said cell and vapors arising from said spray are condensed and congealed on said pipe.

10. In a device of the class described, a casing, a liquid reservoir at the lower end of said casing, a hollow walled cell open at its lower end positioned within said casing above said reservoir, means for spraying liquid from said reservoir through the open end into said cell, so that excess liquid may drain therefrom to said reservoir, a length of pipe within said casing externally of said cell and communicating at one end with the hollow walls thereof, and means for spraying said pipe to remove condensed and congealed vapors therefrom and drain to said reservoir.

11. In a device of the class described, a casing open at its lower end, a liquid reservoir movable into and out of sealing engagement with the lower end of said casing, a cell in said casing, means to convey liquid from said reservoir to said cell, means to freeze the liquid in said cell, and a counterweight tending to maintain said reservoir in sealing engagement with said casing.

12. In a device of the class described, a casing, means for initially exhausting said casing, a hollow walled cell in said casing, means for spraying a liquid in said cell, means for condensing vapor from said spray, and means for circulating a refrigerant through the walls of said cell and through said condensing means.

13. In a device of the class described, a casing, means for initially exhausting said casing, a hollow walled cell in said casing, means for spraying a liquid in said cell, means for condensing and congealing vapor from said spray, means for circulating a refrigerant through the walls of said cell and through said condensing means and means for removing the congealed vapor into the sprayed liquid to cool the same.

In testimony whereof I have affixed my signature.

WILLIAM STEWART.